(12) United States Patent
Ueda et al.

(10) Patent No.: US 7,781,121 B2
(45) Date of Patent: Aug. 24, 2010

(54) FUEL CELL

(75) Inventors: Hideyuki Ueda, Osaka (JP); Shinsuke Fukuda, Osaka (JP)

(73) Assignee: Panasonic Corporation, Osaka (JP)

( * ) Notice: Subject to any disclaimer, the term of this patent is extended or adjusted under 35 U.S.C. 154(b) by 37 days.

(21) Appl. No.: 11/953,749

(22) Filed: Dec. 10, 2007

(65) Prior Publication Data

US 2008/0160386 A1 Jul. 3, 2008

(30) Foreign Application Priority Data

Dec. 27, 2006 (JP) .............................. 2006-352769

(51) Int. Cl.
*H01M 8/02* (2006.01)
(52) U.S. Cl. ........................ 429/514; 429/447; 429/457
(58) Field of Classification Search .................... 429/12, 429/14, 34, 50, 94
See application file for complete search history.

(56) References Cited

U.S. PATENT DOCUMENTS

| | | | | |
|---|---|---|---|---|
| 5,300,370 A | * | 4/1994 | Washington et al. | .......... 429/34 |
| 5,776,625 A | * | 7/1998 | Kaufman et al. | .............. 429/30 |
| 6,007,933 A | * | 12/1999 | Jones | .......................... 429/38 |
| 2002/0081477 A1 | * | 6/2002 | McLean et al. | ................ 429/34 |
| 2004/0209141 A1 | * | 10/2004 | Yamazaki et al. | ............. 429/32 |
| 2005/0118488 A1 | | 6/2005 | Sadamoto | |
| 2006/0115705 A1 | * | 6/2006 | Choi et al. | ..................... 429/38 |

FOREIGN PATENT DOCUMENTS

| | | |
|---|---|---|
| JP | 08-045520 | 2/1996 |
| JP | 2002-110191 | 4/2002 |
| JP | 2005-108688 | 4/2005 |
| JP | 2006-156398 | 6/2006 |

\* cited by examiner

*Primary Examiner*—Jennifer K Michener
*Assistant Examiner*—Carlos Barcena
(74) *Attorney, Agent, or Firm*—Dickinson Wright PLLC

(57) ABSTRACT

The fuel cell of this invention includes at least one unit cell that includes: a membrane-electrode assembly including an electrolyte membrane sandwiched between an anode and a cathode; an anode-side separator in contact with the anode and having a fuel flow path for supplying a fuel to the anode; and a cathode-side separator in contact with the cathode and having an oxidant flow path for supplying an oxidant to the cathode. The fuel flow path has a first flow channel and a second flow channel, and each of the first flow channel and the second flow channel has a fuel inlet and a fuel outlet. The first flow channel and the second flow channel are adjacent to each other, and the direction of the flow of fuel through the first flow channel is opposite to the direction of the flow of fuel through the second flow channel.

7 Claims, 3 Drawing Sheets

FUEL CELL

FIELD OF THE INVENTION

The invention relates to fuel cells, and more specifically, to improvements in the fuel flow channel of a separator.

BACKGROUND OF THE INVENTION

With the advancement of ubiquitous network society, there is a large demand for mobile devices such as cellular phones, notebook personal computers, and digital still cameras. As the power source for mobile devices, it is desired to put fuel cells into practical use as early as possible since fuel cells do not need charging and permit continuous use of such devices if they are resupplied with fuel.

Among fuel cells, direct oxidation fuel cells are receiving attention and their research and development is actively conducted. Direct oxidation fuel cells generate power by directly supplying an organic fuel, such as methanol or dimethyl ether, to an anode and oxidizing it without reforming it into hydrogen. Organic fuels have high theoretical energy densities and are easy to store. In addition, the use of an organic fuel enables simplification of fuel cell systems.

Direct oxidation fuel cells have a cell structure in which an electrolyte membrane-electrode assembly (MEA) is sandwiched between separators. The MEA typically includes an electrolyte membrane sandwiched between an anode and a cathode, and each of the anode and the cathode includes a catalyst layer and a diffusion layer. Such a direct oxidation fuel cell generates power by supplying a fuel and water to the anode and supplying an oxidant to the cathode.

For example, the electrode reactions of a direct methanol fuel cell (DMFC), which uses methanol as the fuel, are as follows.

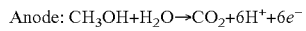

Anode: $CH_3OH+H_2O \rightarrow CO_2+6H^++6e^-$

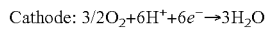

Cathode: $3/2O_2+6H^++6e^- \rightarrow 3H_2O$

On the anode, methanol reacts with water to produce carbon dioxide, protons, and electrons. The protons migrate to the cathode through the electrolyte membrane and the electrons migrate to the cathode through an external circuit. On the cathode, these protons and electrons combine with oxygen to produce water.

However, putting direct oxidation fuel cells into practical use has some problems.

One of the problems is unevenness of fuel concentration in the fuel flow channel of a separator. A fuel supplied to the anode is gradually consumed by power generation and fuel crossover (phenomenon in which a fuel supplied to the anode migrates to the cathode through the electrolyte membrane without reacting) while passing through the fuel flow channel. Thus, the fuel concentration on the fuel outlet side becomes lower than that on the fuel inlet side, thereby causing a gradient of fuel concentration in the anode. Since the speed of electrode reaction is proportional to the fuel concentration, an imbalance of electrode reaction tends to occur between the fuel inlet side and the fuel outlet side, thereby resulting in a decrease in the durability of the MEA.

Further, fuel crossover lowers the fuel utilization rate or cathode potential, thereby resulting in degradation of power generating characteristics.

To suppress unevenness of fuel concentration in the fuel flow channel, there have been many proposals to divide the fuel flow channel in order to reduce the length of the flow channel.

For example, Japanese Laid-Open Patent Publication No. 2006-156398 (Document 1) discloses a separator having a plurality of flow channels. These flow channels have substantially the same length, and each of the flow channels is divided into a plurality of groups. Such structure reduces the gradient of fuel concentration in the respective flow channels and decreases the pressure loss in the respective flow channels.

Japanese Laid-Open Patent Publication No. 2005-108688 (Document 2) proposes a separator having two fuel flow channels that are symmetric with respect to a line. The separator has one fuel inlet and two fuel outlets. The fuel inlet is disposed in the central part of a predetermined side of the separator, and the two fuel outlets are arranged on the side opposite to the side with the fuel inlet such that they are symmetric with respect to a predetermined axis. Such structure can suppress the pressure loss in the fuel flow channels and make the fuel concentration distribution and temperature distribution uniform.

Also, Japanese Laid-Open Patent Publication No. Hei 8-45520 (Document 3), which is not directed to a direct oxidation fuel cell, discloses a gas flow channel that spirally winds inward and makes a reverse turn in the center thereof. Such structure minimizes the change in the flow direction of gas and can reduce the pressure loss.

Further, to reduce fuel crossover, there have been many proposals to improve anode structure.

For example, Japanese Laid-Open Patent Publication No. 2002-110191 (Document 4) discloses that the methanol permeation coefficient of the anode diffusion layer is made greater more downstream of the fuel flow channel. Since methanol crossover in the first half of the fuel flow channel and methanol shortage in the latter half of the fuel flow channel are suppressed, fuel can be uniformly supplied to the anode. In Document 4, the anode diffusion layer comprises a carbon paper substrate and a mixed layer formed on the substrate. The mixed layer includes an electronically conductive porous material such as carbon black and a water-repellent binding material such as polytetrafluoroethylene. The methanol permeation coefficient is adjusted by, along the flow direction of fuel, (i) reducing the thickness of the mixed layer, (ii) decreasing the weight ratio of the water-repellent binding material, (iii) lowering the water repellency of the electronically conductive porous material, and/or (iv) increasing at least one of the porosity and the pore size of the electronically conductive porous material.

However, according to the above-mentioned conventional art, it is not possible to reduce the gradient of fuel concentration in the power generation section and hence ensure uniform supply of fuel. It is therefore difficult to provide a direct oxidation fuel cell which does not suffer from a decrease in fuel utilization rate and has excellent power generating characteristics.

For example, as in the techniques disclosed in Documents 1 and 2, even if the fuel flow channel is divided to reduce the length of the flow channel, it is not possible to drastically solve the problems of excessive supply of fuel upstream of the fuel flow channel and fuel shortage downstream thereof.

Since fuel permeates and diffuses through the diffusion layer, the fuel is not necessarily supplied to the anode along the flow direction of fuel in the fuel flow channel. Hence, even if the technique disclosed in Document 3 is used, it is difficult to reduce the gradient of fuel concentration.

With respect to the technique disclosed in Document 4, sufficient consideration is not given to the influence of, for example, methanol concentration and operating temperature on the methanol permeation coefficient of the anode diffusion layer. Therefore, for example, when high concentration methanol is used as the fuel or when the operating temperature is set high, methanol crossover increases, thereby resulting in a significant increase in the gradient of methanol concentration in the anode.

In view of the problems as described above, it is an object of the invention to provide a fuel cell which does not suffer from a decrease in fuel utilization rate and has excellent power generating characteristics.

BRIEF SUMMARY OF THE INVENTION

A fuel cell according to the invention includes at least one unit cell that includes: a membrane-electrode assembly including an electrolyte membrane sandwiched between an anode and a cathode; an anode-side separator in contact with the anode and having a fuel flow path for supplying a fuel to the anode; and a cathode-side separator in contact with the cathode and having an oxidant flow path for supplying an oxidant to the cathode. The fuel flow path has a first flow channel and a second flow channel, and each of the first flow channel and the second flow channel has a fuel inlet and a fuel outlet. The first flow channel and the second flow channel are adjacent to each other, and the direction of the flow of fuel through the first flow channel is opposite to the direction of the flow of fuel through the second flow channel.

In the area of the anode-side separator in contact with the anode, the first flow channel and the second flow channel are preferably parallel and serpentine. Also, in this area, the first flow channel and the second flow channel preferably have substantially the same length.

It is preferable that the length of one of the first and second flow channels from the fuel inlet to the area of the anode-side separator in contact with the anode be substantially the same as the length of the other flow channel from the fuel outlet to the area of the anode-side separator in contact with the anode.

The above-described fuel cell can be operated by an operation method including the step of supplying a fuel to the anode by passing the fuel through the first flow channel and the second flow channel such that the direction of the flow of fuel through the first flow channel is opposite to the direction of the flow of fuel through the second flow channel.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The fuel cell of the invention includes at least one unit cell that includes: a membrane-electrode assembly including an electrolyte membrane sandwiched between an anode and a cathode; an anode-side separator in contact with the anode and having a fuel flow path for supplying a fuel to the anode; and a cathode-side separator in contact with the cathode and having an oxidant flow path for supplying an oxidant to the cathode. The fuel flow path has a first flow channel and a second flow channel, and each of the first flow channel and the second flow channel has a fuel inlet and a fuel outlet. The first flow channel and the second flow channel are adjacent to each other, and the direction of the flow of fuel through the first flow channel is opposite to the direction of the flow of fuel through the second flow channel. The fuel flow path may have a plurality of first flow channels and a plurality of second flow channels. In this case, it is preferable to alternately arrange the first flow channels and the second flow channels.

Referring now to drawings, the invention is specifically described.

Embodiment 1

Figure 1:
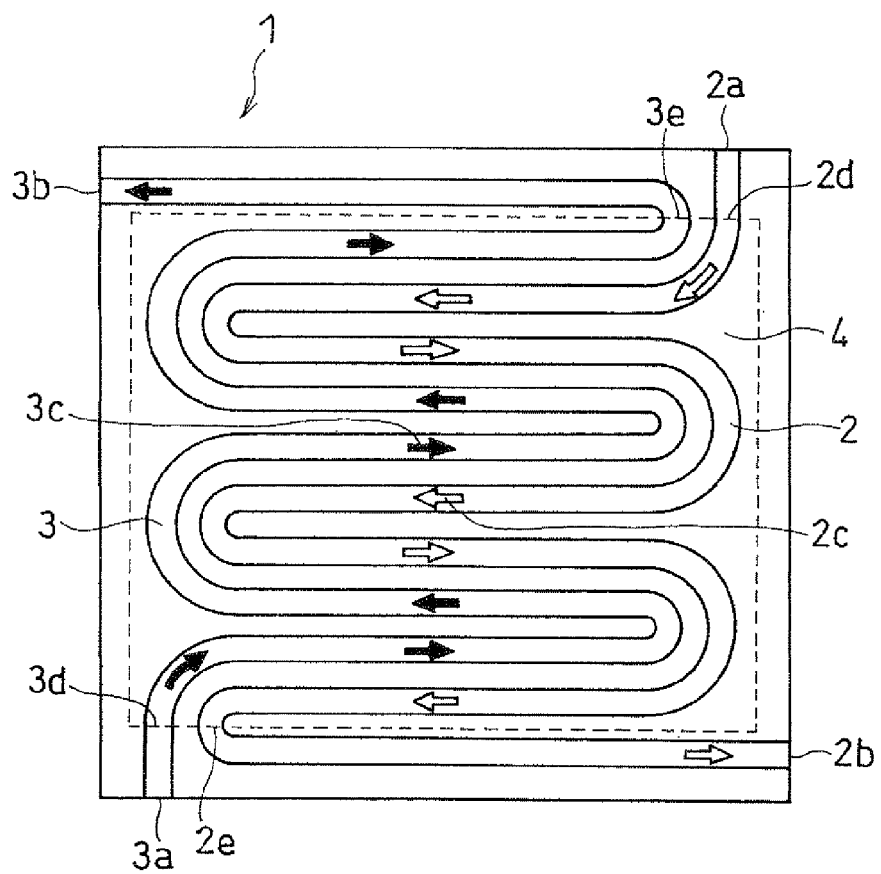
FIG. 1 is a top view of an anode-side separator included in a fuel cell according to one embodiment of the invention.

FIG. 1 is a top view of the anode side of a separator included in a fuel cell according to one embodiment of the invention.

In FIG. 1, a separator 1 has a fuel flow path on the anode-facing surface. The fuel flow path includes a first flow channel 2 and a second flow channel 3 through which a fuel flows. The first flow channel 2 communicates with a first fuel inlet 2a and a first fuel outlet 2b. The second flow channel 3 communicates with a second fuel inlet 3a and a second fuel outlet 3b. The first fuel inlet 2a and the second fuel inlet 3a are inlets through which a fuel flows into the first flow channel 2 and the second flow channel 3 (i.e., the inlets through which the fuel flows into the separator). The first fuel outlet 2b and the second fuel outlet 3b are outlets through which the fuel flows out of the first flow channel 2 and the second flow channel 3 (i.e., the outlets through which the fuel is discharged from the separator).

In an area 4 of the separator 1 in contact with the anode (i.e., the area surrounded by the dotted line in FIG. 1), the first flow channel 2 and the second flow channel 3 are adjacent, and a direction 2c of the flow of fuel through the first flow channel 2 is opposite to a direction 3c of the flow of fuel through the second flow channel 3. In the separator 1 of FIG. 1, the first fuel inlet 2a and the second fuel inlet 3a, and the first fuel outlet 2b and the second fuel outlet 3b are arranged symmetrically with respect to the geometrical center of the separator (i.e., symmetrically with respect to a point). Thus, in the separator of FIG. 1, the direction 2c of the flow of fuel through the first flow channel is opposite to the direction 3c of the flow of fuel through the second flow channel. It should be noted, however, that the positions of the first fuel inlet 2a, the first fuel outlet 2b, the second fuel inlet 3a, and the second fuel outlet 3b are not particularly limited as long as the flow direction 2c and the flow direction 3c are opposite.

As described above, in the area 4, the first flow channel 2 and the second flow channel 3 are adjacent, and the flow direction 2c is opposite to the flow direction 3c. That is, the downstream side of one flow channel and the upstream side of the other flow channel are adjacent. Hence, the fuel from the first flow channel and the fuel from the second flow channel can be homogeneously mixed with each other in the process of permeation and diffusion through the diffusion layer. Specifically, the high concentration fuel on the inlet side of the first flow channel and the low concentration fuel on the outlet side of the second flow channel are homogeneously mixed together inside the diffusion layer, and the low concentration fuel on the outlet side of the first flow channel and the high concentration fuel on the inlet side of the second flow channel are homogeneously mixed together inside the diffusion layer. It is therefore possible to reduce the gradient of fuel concentration in the anode and ensure uniform supply of fuel. As a result, it is possible to improve power generation stability without lowering the fuel utilization rate.

The distance between adjacent flow channels is preferably 0.5 to 5 mm. This ensures electronic conductivity and can promote homogeneous mixing of fuel.

The width of each flow channel is preferably 0.5 to 5 mm. This can promote homogenous mixing of fuel, reduce the pressure loss in the fuel flow channel, and prevent the diffusion layer from sagging into the fuel flow channel and hence blocking the fuel flow channel.

The depth of each flow channel is preferably 0.2 to 2 mm.

In the invention, although the shape of the fuel flow path is not particularly limited, it is preferable that the first flow channel and the second flow channel be parallel in the area 4 and be serpentine such that they pass through the whole area 4, as illustrated in FIG. 1. That is, the part of the first flow channel from a position 2d at which the fuel flows into the area 4 to a position 2e at which the fuel flows out of the area 4, and the part of the second flow channel from a position 3d at which the fuel flows into the area 4 to a position 3e at which the fuel flows out of the area 4 are preferably parallel and serpentine. FIG. 1 illustrates a serpentine flow channel as a preferable example.

With such a structure, the fuel can be uniformly supplied to the whole area 4 or the whole anode.

Further, it is preferable that the length of the first flow channel 2 in the area 4 and the length of the second flow channel 3 in the area 4 be substantially equal. That is, it is preferable that the length of the first flow channel 2 from the position 2d to the position 2e and the length of the second flow channel 3 from the position 3d to the position 3e be substantially equal. In this case, the respective flow channels have almost the same degree of gradient of fuel concentration from the upstream side to the downstream side. It is therefore possible to further improve the uniformity of fuel concentration in the anode. The length of the first flow channel 2 in the area 4 and the length of the second flow channel 3 in the area 4 are more preferably equal.

In the part of the separator not in contact with the anode (i.e., the part of the separator outside the area 4), the first flow channel and the second flow channel may be parallel, or may not be parallel as illustrated in FIG. 1.

The number of flow channels constituting the fuel flow path may be two as described above, or may be three or more. For example, when the fuel flow path is composed of three flow channels, the three flow channels are arranged in parallel such that the direction of the flow of fuel through the middle flow channel is opposite to the direction of the flow of fuel through the other two flow channels and the flow rate or concentration of fuel through the middle flow channel is equal to the total flow rate or total concentration of fuel through the other two channels. Such channel structure and fuel supply can make the distribution of fuel concentration uniform in the anode. When the fuel flow path is composed of four flow channels, it is preferable that the fuel flow directions thereof be alternately opposite.

Further, each of the first flow channel and the second flow channel may branch off such that it has a main channel and a sub channel. In this case, the first flow channel and the second flow channel are preferably disposed such that the direction of the flow of fuel through the main channel of the first flow channel is opposite to the direction of the flow of fuel through the main channel of the second flow channel.

An oxidant flow path for supplying an oxidant is formed on a cathode-side separator (not shown). When a plurality of unit cells each including a membrane-electrode assembly, an anode-side separator in contact with the anode, and a cathode-side separator in contact with the cathode are stacked, an oxidant flow path may be formed on the face of the anode-side separator 1 opposite to the face in contact with the anode (illustrated in FIG. 1).

Figure 2:
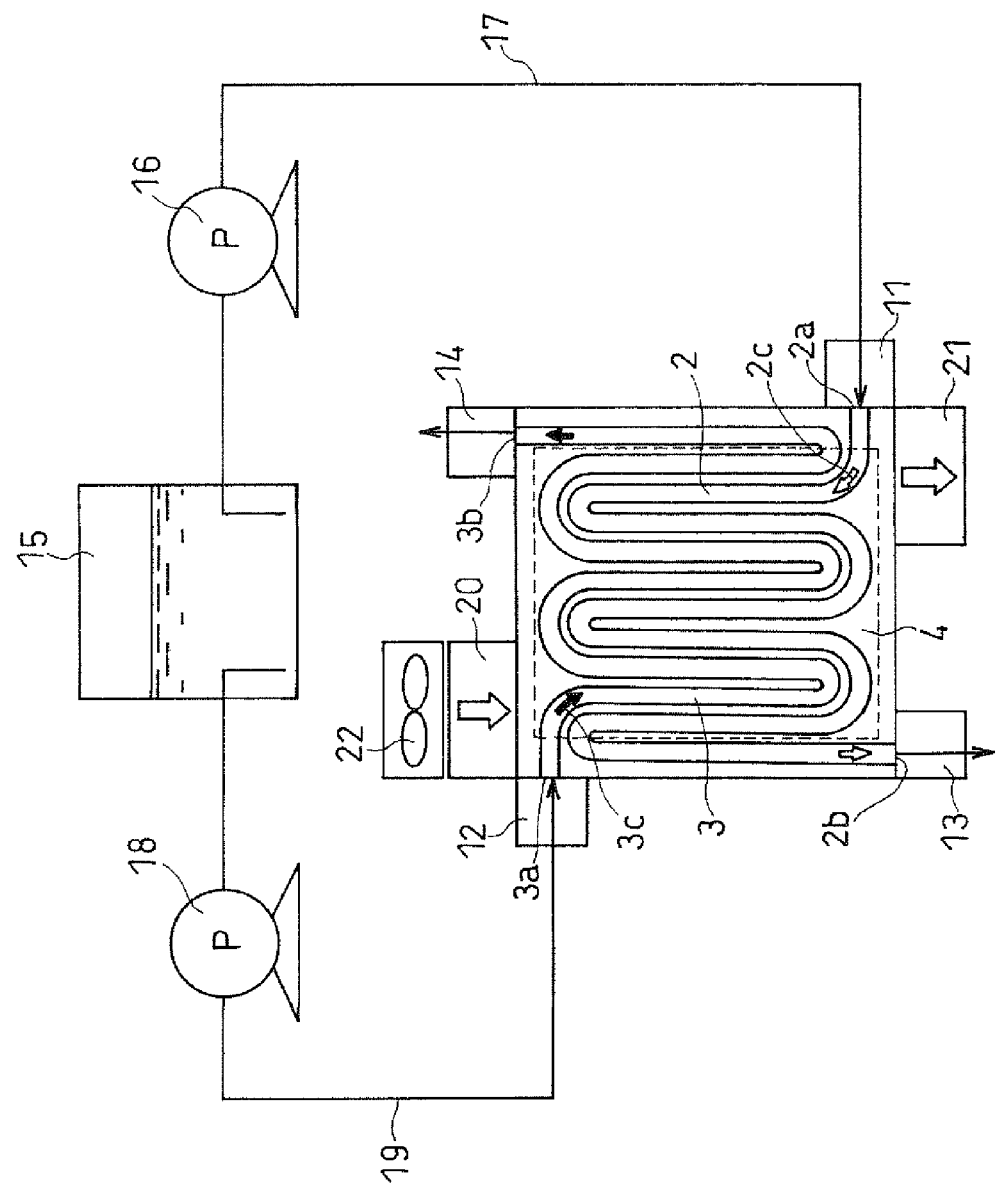
FIG. 2 is a schematic view of a fuel cell according to one embodiment of the invention.

Referring to FIG. 2, an exemplary fuel cell including the separator 1 is described.

When the power generation section of the fuel cell of FIG. 2 has a plurality of unit cells, the power generation section is formed, for example, by alternately stacking the above-described separators 1 and membrane-electrode assemblies. It should be noted that these separators 1 have an oxidant flow path on the face opposite to the face with the fuel flow path.

The membrane-electrode assemblies each have a proton-conductive electrolyte membrane, an anode disposed on one face thereof, and a cathode disposed on the other face. The anode and the cathode each include a catalyst layer and a diffusion layer. Further, gas sealing materials are fitted around the anode and the cathode in the unit cell in order to prevent leakage of fuel or oxidant.

In FIG. 2, with respect to the power generation section, only the face of one separator 1 with the fuel flow path is illustrated, and membrane-electrode assemblies, other separators, and the like are not illustrated.

The first fuel inlet 2a and the second fuel inlet 3a of the separator 1 are connected to a first fuel supply section 11 and a second fuel supply section 12, respectively, in external manifolds which are installed along the power generation section. The first fuel outlet 2b and the second fuel outlet 3b are connected to a first fuel discharge section 13 and a second fuel discharge section 14, respectively, in external manifolds which are installed along the power generation section.

The fuel cell of FIG. 2 is further equipped with a fuel tank 15 and pumps 16 and 18. Methanol, dimethyl ether, or the like can be used as the fuel contained in the fuel tank 15. Also, an aqueous solution containing methanol, dimethyl ether, or the like at a predetermined concentration can be used as the fuel.

The fuel in the fuel tank 15, whose flow rate is adjusted to a predetermined value by the pump 16, is transported to the first fuel supply section 11 through a supply pipe 17. The fuel then flows into the first flow channel 2 from the first fuel inlet 2a of the separator 1 and travels through the first flow channel 2. Surplus fuel not utilized for power generation passes through the first fuel outlet 2b and is discharged from the first fuel discharge section 13.

Likewise, the fuel whose flow rate is adjusted to a predetermined value by the pump 18 is transported to the second fuel supply section 12 through a supply pipe 19. The fuel then flows into the second flow channel 3 from the second fuel inlet 3a of the separator 1 and travels through the second flow channel 3. Surplus fuel not utilized for power generation passes through the second fuel outlet 3b and is discharged from the second fuel discharge section 14.

As described above, in the area 4 of the separator 1, the direction 2c of the flow of fuel through the first flow channel 2 is opposite to the direction 3c of the flow of fuel through the second flow channel 3. That is, in the fuel cell of FIG. 2, the fuel is supplied to the anode by flowing through the first flow channel 2 and the second flow channel 3 in opposite directions.

In this way, by passing the fuel through the first flow channel and the second flow channel, the fuel can be uniformly distributed over the anode.

As described above, the other face of the separator 1 is provided with an oxidant flow path (not shown) for supplying an oxidant such as air to the cathode, an oxidant inlet (not shown), and an oxidant outlet (not shown). The oxidant flow path communicates with the oxidant inlet and the oxidant outlet.

The oxidant inlet is connected to an oxidant supply section 20 in an external manifold that is installed along the power generation section. The oxidant outlet is connected to an oxidant discharge section 21 in an external manifold that is installed along the power generation section.

The oxidant is transported to the oxidant supply section 20 by using, for example, an oxidant supply means 22 such as a fan. The oxidant then flows into the oxidant flow path from the oxidant inlet and travels through the oxidant flow path. Surplus oxidant not utilized for power generation and water pass through the oxidant outlet and are discharged from the oxidant discharge section 21. In the cathode-side separator, the oxidant flow path may have one flow channel or two or more flow channels. When the oxidant flow path has two or more flow channels, it may have the same structure as that of the fuel flow path.

The fuel cell of the present invention may have external manifolds installed along the power generation section as illustrated in FIG. 2 or may have internal manifolds formed in the periphery of separators and membrane-electrode assemblies so as to connect fuel flow paths and oxidant flow paths of the separators.

Embodiment 2

Figure 3:
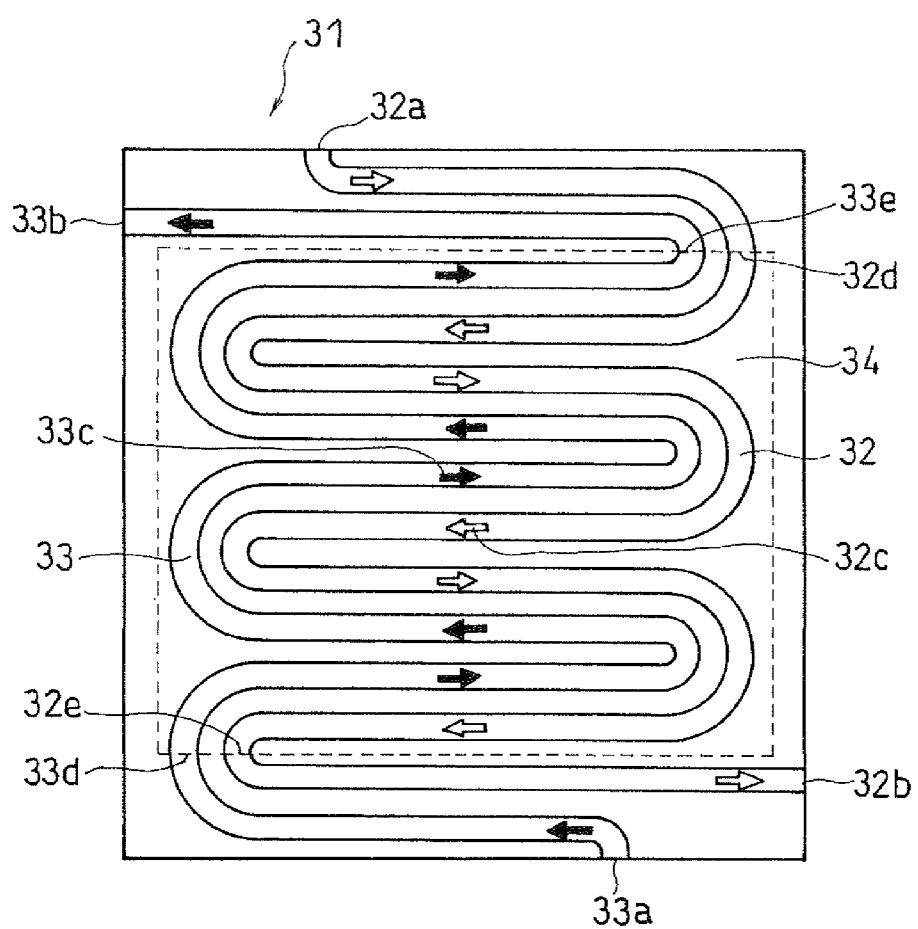
FIG. 3 is a top view of an anode-side separator included in a fuel cell according to another embodiment of the invention.

FIG. 3 is a top view of the anode side of a separator included in a fuel cell according to another embodiment of the invention.

In a separator 31 of FIG. 3, the length of one flow channel from the fuel inlet to the area of the anode-side separator in contact with the anode is substantially equal to the length of the other flow channel from the fuel outlet to the area of the anode-side separator in contact with the anode. Specifically, the length of a first flow channel 32 from a first fuel inlet 32a to a position 32d at which a fuel flows into an area 34 of the separator in contact with the anode is substantially equal to the length of a second flow channel 33 from a position 33e at which the fuel flows out of the area 34 to a second fuel outlet 33b. Likewise, the length of the second flow channel 33 from a second fuel inlet 33a to a position 33d at which the fuel flows into the area 34 is substantially equal to the length of the first flow channel 32 from a position 32e at which the fuel flows out of the area 34 to a first fuel outlet 32b.

In such a structure, in the area of the separator not in contact with the anode, the pressure loss in the first flow channel and the pressure loss in the second flow channel become equivalent. It is thus possible to prevent a short path of fuel, i.e., to prevent, for example, the fuel supplied from the first fuel inlet 32a from being discharged from the second fuel outlet 33b through the adjacent second flow channel without permeating and diffusing in the area 34. As a result, it is possible to further promote uniform supply of fuel, further suppress the decrease in fuel utilization rate, and further enhance power generation stability.

In this embodiment, also, in the area of the separator not in contact with the anode, the first flow channel and the second flow channel may be parallel, may be partially parallel as illustrated in FIG. 3, or may not be parallel.

The length of the first flow channel 32 from the first fuel inlet 32a to the position 32d and the length of the second flow channel 33 from the second fuel inlet 33a to the position 33d are more preferably equal. In this case, the pressure loss in the first flow channel 32 and the pressure loss in the second flow channel 33 become equivalent, thereby making it possible to prevent a short path of fuel. As a result, it is possible to further promote uniform supply of fuel to the anode. It should be noted that the length of the first flow channel 32 from the first fuel inlet 32a to the position 32d and the length of the second flow channel 33 from the second fuel inlet 33a to the position 33d may be different.

In the area 34, a direction 32c of the flow of fuel through the first flow channel 32 is opposite to a direction 33c of the flow of fuel through the second flow channel 33 in the same manner as in Embodiment 1. The shape, length, and the like of the first flow channel 32 and the second flow channel 33 in the area 34 are also the same as those in Embodiment 1.

Further, the supply of fuel and oxidant to the power generation section of the fuel cell can be made in the same manner as in Embodiment 1.

The fuel cell of the present invention has excellent power generating characteristics. This fuel cell is useful, for example, as the power source for portable, small-sized electronic devices such as cellular phones, personal digital assistants (PDA), notebook PCs, and video cameras. The fuel cell of the present invention can also be used, for example, as the power source for electric scooters, etc.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. A direct oxidation fuel cell comprising at least one unit cell, a fuel tank containing a liquid fuel, a first pump, and a second pump, said unit cell including:

a membrane-electrode assembly comprising an electrolyte membrane sandwiched between an anode and a cathode;

an anode-side separator in contact with said anode, said anode-side separator having a fuel flow path for supplying a fuel to said anode; and a cathode-side separator in contact with said cathode, said cathode-side separator having an oxidant flow path for supplying an oxidant to said cathode, wherein:

said fuel flow path comprises a first flow channel and a second flow channel, said first flow channel has a first fuel inlet and a first fuel outlet, said second flow channel has a second fuel inlet and a second fuel outlet, said first fuel inlet and said first fuel outlet are different form said second fuel inlet and said second fuel outlet, said liquid fuel contained in said fuel tank is supplied to said first fuel inlet by said first pump and is supplied to said second fuel inlet by said second pump, an upstream side of said first flow channel is adjacent to a downstream side of said second flow channel, an upstream side of said second flow channel is adjacent to a downstream side of said first flow channel, and the direction of the flow of fuel through said first flow channel is opposite to the direction of the flow of fuel through said second flow channel.

2. The direct oxidation fuel cell in accordance with claim 1, wherein in the area of said anode-side separator in contact with said anode, said first flow channel and said second flow channel are parallel and serpentine.

3. The direct oxidation fuel cell in accordance with claim 1, wherein in the area of said anode-side separator in contact with said anode, said first flow channel and said second flow channel have substantially the same length.

4. The direct oxidation fuel cell in accordance with claim 1, wherein the length of one of the first and second flow channels from said fuel inlet to the area of said anode-side separator in contact with said anode is substantially the same as the length of the other flow channel from said fuel outlet to the area of said anode-side separator in contact with said anode.

5. The direct oxidation fuel cell in accordance with claim 1, wherein said first flow channel and said second flow channel do not communicate with each other.

6. The direct oxidation fuel cell in accordance with claim 1, wherein said anode-side separator is rectangular, and said first fuel inlet and said second fuel inlet are arranged symmetrically with respect to the geometrical center of said anode-side separator, and said first fuel outlet and said second fuel outlet are arranged symmetrically with respect to the geometrical center of said anode-side separator.

7. An operating method of a direct oxidation fuel cell, said fuel cell comprising at least one unit cell, a fuel tank containing a liquid fuel, a first pump, and a second pump, said unit cell including: a membrane-electrode assembly comprising an electrolyte membrane sandwiched between an anode and a cathode; an anode-side separator in contact with said anode, said anode-side separator having a fuel flow path for supplying a fuel to said anode; and a cathode-side separator in contact with said cathode, said cathode-side separator having an oxidant flow path for supplying an oxidant to said cathode; said fuel flow path comprising a first flow channel and a second flow channel, said first flow channel having a first fuel inlet and a first fuel outlet, said second flow channel having a second fuel inlet and a second fuel outlet, said first fuel inlet and said first fuel outlet being different from said second fuel inlet and said second fuel outlet, an upstream side of said first flow channel being adjacent to a downstream side of said second flow channel, and an upstream side of said second flow channel being adjacent to a downstream side of said first flow channel, said method comprising the step of:

supplying said liquid fuel contained in said fuel tank to said first fuel inlet by said first pump, supplying said liquid fuel to said second fuel inlet by said second pump, and supplying said liquid fuel to said anode by passing said liquid fuel through said first flow channel and said second flow channel such that the direction of the flow of said liquid fuel through said first flow channel is opposite to the direction of the flow of said liquid fuel through said second flow channel.

* * * * *